(12) United States Patent
Ide (10) Patent No.: US 9,323,415 B2
(45) Date of Patent: Apr. 26, 2016

(54) APPARATUS AND ASSOCIATED METHODS RELATED TO TOUCH SENSITIVE DISPLAYS

(75) Inventor: Masahiko Ide, Lempäälä (JP)

(73) Assignee: Nokia Technologies Oy, Espoo (FI)

( * ) Notice: Subject to any disclaimer, the term of this patent is extended or adjusted under 35 U.S.C. 154(b) by 615 days.

(21) Appl. No.: 13/172,594

(22) Filed: Jun. 29, 2011

(65) Prior Publication Data

US 2013/0002719 A1    Jan. 3, 2013

(51) Int. Cl.
*G06F 3/0481* (2013.01)
*G06F 3/0484* (2013.01)
*G06F 3/0488* (2013.01)

(52) U.S. Cl.
CPC .......... *G06F 3/0481* (2013.01); *G06F 3/04842* (2013.01); *G06F 3/04883* (2013.01); *G06F 2203/04805* (2013.01)

(58) Field of Classification Search
USPC .......................................................... 345/660
See application file for complete search history.

(56) References Cited

U.S. PATENT DOCUMENTS

| | | | | |
|---|---|---|---|---|
| 2005/0168488 A1* | 8/2005 | Montague | ...................... | 345/659 |
| 2007/0260981 A1* | 11/2007 | Kim et al. | ..................... | 715/531 |
| 2008/0165142 A1* | 7/2008 | Kocienda et al. | ............. | 345/173 |
| 2008/0259040 A1* | 10/2008 | Ording et al. | ................. | 345/173 |
| 2009/0070705 A1* | 3/2009 | Ording | .......................... | 715/784 |
| 2009/0225039 A1* | 9/2009 | Williamson et al. | .......... | 345/173 |
| 2009/0237371 A1* | 9/2009 | Kim et al. | ..................... | 345/173 |
| 2010/0066764 A1* | 3/2010 | Refai | ............................. | 345/660 |
| 2010/0289757 A1* | 11/2010 | Budelli | .......................... | 345/173 |
| 2010/0302281 A1* | 12/2010 | Kim | ................................ | 345/661 |
| 2010/0315438 A1* | 12/2010 | Horodezky et al. | ........... | 345/661 |
| 2011/0013049 A1* | 1/2011 | Thorn | ......................... | 348/240.3 |
| 2011/0029917 A1* | 2/2011 | Um | ................................ | 715/800 |
| 2011/0043538 A1* | 2/2011 | Ericson et al. | ................ | 345/660 |
| 2011/0080364 A1* | 4/2011 | Ording et al. | ................. | 345/173 |
| 2011/0157028 A1* | 6/2011 | Stallings et al. | ............... | 345/173 |
| 2011/0164060 A1* | 7/2011 | Miyazawa et al. | ............. | 345/660 |
| 2011/0239153 A1* | 9/2011 | Carter et al. | .................. | 715/784 |
| 2012/0197857 A1* | 8/2012 | Huang et al. | .................. | 707/706 |

FOREIGN PATENT DOCUMENTS

FR          2 948 808 A1    2/2011
WO     WO 2010/032354 A1   3/2010

* cited by examiner

*Primary Examiner* — Chante Harrison
(74) *Attorney, Agent, or Firm* — Harrington & Smith (57) ABSTRACT

In one or more embodiments described herein, there is provided an apparatus which comprises at least one processor and at least one memory including computer program code. The at least one memory and the computer program code are configured to, with the at least one processor, cause the apparatus to perform certain steps. Firstly, the apparatus is caused to present, in response to detection of first touch signalling on a particular portion of a touch-sensitive display, a magnified view of at least that particular portion of the touch-sensitive display and an indicator positioned corresponding to the detected position of the first touch signalling. Secondly, the apparatus is caused to, upon release of the first touch signalling, maintain the magnified view of that particular portion and the positioned indicator for a predetermined period. Thirdly, the apparatus is caused to allow for detection of second touch signalling during the predetermined period to allow the user to cause movement of the position of the indicator.

19 Claims, 9 Drawing Sheets

Hi John. Where would you like to go for lunch today? I know a nice little Italian close by. Let me know what you prefer. Jim

Fig. 4a

Hi John. Where would you like to go for lunch today. I know a nice little Italian close by. Let me know what you prefer. Jim

APPARATUS AND ASSOCIATED METHODS RELATED TO TOUCH SENSITIVE DISPLAYS

TECHNICAL FIELD

The present disclosure relates to the field of indicator or cursor positioning in touch sensitive displays, associated methods, computer programs and apparatus.

SUMMARY

In a first aspect, there is provided an apparatus comprising:
at least one processor; and
at least one memory including computer program code,
the at least one memory and the computer program code configured to, with the at least one processor, cause the apparatus to perform at least the following:
present, in response to detection of first touch signalling on a particular portion of a touch-sensitive display, a magnified view of at least that particular portion of the touch-sensitive display and an indicator positioned corresponding to the detected position of the first touch signalling;
upon release of the first touch signalling, maintain the magnified view of that particular portion and the positioned indicator for a predetermined period; and
allow for detection of second touch signalling during the predetermined period to allow the user to cause movement of the position of the indicator.

The at least one memory and the computer program code may be configured to, with the at least one processor, cause the apparatus to allow for detection of the second touch signalling during the predetermined period to allow the user to cause movement of the position of the indicator at a lower granularity than the first touch signalling.

The at least one memory and the computer program code may be configured to, with the at least one processor, cause the apparatus to present the magnified view such that it is positioned away from the associated particular portion of the touch-sensitive display.

The indicator may be one or more of:
a cursor, a caret, indicator of a highlighted region of displayed content The indicator may be positionable to allow for highlighting of a particular area of at least some of the magnified view.

The indicator may allow for one or more of:
insertion, deletion, and selection of content proximate to the position associated with the indicator.

Content may comprise one or more of the following:
text, graphical images, video/video regions, content file, content hyperlink, or the like.

The magnified view may be able to be grabbed by the user in response to second touch signalling so as to allow the user to cause movement of the position of the indicator.

The magnified view may be able to be grabbed so that the magnified view itself is movable, and the magnified view presents a magnified view of at least the particular portion of the touch sensitive display associated with the second touch signalling.

The magnified view may be able to be grabbed so that the magnified view itself is movable, and the magnified view presents a magnified view of at least the particular portion of the touch sensitive display associated with the second touch signalling together with the indicator positioned corresponding to the currently detected position of the second touch signalling.

The relative position of the indicator in the magnified view may be locked with the magnified view to allow for selection of a new indicator position with movement of the magnified view.

The view within the magnified view may be refreshed to reflect the changing content as the magnified view is moved.

The magnified view may be able to be grabbed so that the magnified view itself is movable, and the magnified view presents a magnified view of at least the particular portion of the touch sensitive display associated with the first touch signalling together with the indicator positioned corresponding to the detected position of the first touch signalling, and wherein the at least one memory and the computer program code configured to, with the at least one processor, cause the apparatus to:
upon release of second touch signalling, allow for detection of third touch signalling to allow the user to cause movement of the position of the indicator and wherein the magnified view is updated to present a magnified view of at least the particular portion of the touch-sensitive display corresponding to the third touch signalling and an indicator positioned corresponding to the currently detected position of the third touch signalling.

The magnified view may be able to be grabbed so that the magnified view itself is movable, and the magnified view presents a magnified view of at least the particular portion of the touch sensitive display associated with the second touch signalling, and wherein the at least one memory and the computer program code configured to, with the at least one processor, cause the apparatus to:
upon release of second touch signalling, allow for detection of third touch signalling within the magnified view to allow the user to cause movement of the position of the indicator to at least the particular portion of the touch sensitive display associated with the second touch signalling as presented by the magnified view.

The magnified view may be able to be grabbed so that the magnified view itself is movable, and the magnified view presents a magnified view of at least the particular portion of the touch sensitive display associated with the second touch signalling together with the indicator positioned corresponding to the currently detected position of the second touch signalling.

The presentation of the magnified view may be provided on the same electronic device as the touch-sensitive display, or on a different electronic device to that having the touch-sensitive display.

The predetermined period may be one or more of:
a predetermined time period, and until receipt of a user-input event.

The predetermined period may be settable by the user, or set by default. A user-input event may constitute touch signalling representative of user-input relating to anything other than indicator positioning. A user-input event may comprise an exit input event to exit indicator positioning mode.

The at least one memory and the computer program code may be configured to, with the at least one processor, cause the apparatus to:
present, in response to detection of second touch signalling during the predetermined period on a particular portion of a touch-sensitive display, a magnified view of at least that particular portion of the touch-sensitive display and an indicator positioned corresponding to the detected position of the second touch signalling.

The at least one memory and the computer program code may be configured to, with the at least one processor, cause the apparatus to:

allow the user to cause movement of the indicator during the predetermined period only within the already presented magnified view.

The movement of the indicator may only be permitted inside/within the area associated with the magnified view. The movement of the indicator may be permitted outside the initial magnified view and the magnified view may follow changes in the position of the indicator.

The apparatus may be one or more of:
an electronic device, a portable electronic device, or a module for an electronic device/portable electronic device.

In another aspect there is provided an apparatus, comprising:
means for presenting that present, in response to detection of first touch signalling on a particular portion of a touch-sensitive display, a magnified view of at least that particular portion of the touch-sensitive display and an indicator positioned corresponding to the detected position of the first touch signalling;
means for maintaining that, upon release of the first touch signalling, maintain the magnified view of that particular portion and the positioned indicator for a predetermined period; and
means for detecting that allow for detection of second touch signalling during the predetermined period to allow the user to cause movement of the position of the indicator.

In another aspect, there is provided a method, comprising:
presenting, in response to detection of first touch signalling on a particular portion of a touch-sensitive display, a magnified view of at least that particular portion of the touch-sensitive display and an indicator positioned corresponding to the detected position of the first touch signalling;
upon release of the first touch signalling, maintaining the magnified view of that particular portion and the positioned indicator for a predetermined period; and
allowing for detection of second touch signalling during the predetermined period to allow the user to cause movement of the position of the indicator.

In another aspect, there is provided a computer program comprising computer program code, the computer program code being configured to, when run on a processor, perform:
presenting, in response to detection of first touch signalling on a particular portion of a touch-sensitive display, a magnified view of at least that particular portion of the touch-sensitive display and an indicator positioned corresponding to the detected position of the first touch signalling;
upon release of the first touch signalling, maintaining the magnified view of that particular portion and the positioned indicator for a predetermined period; and
allowing for detection of second touch signalling during the predetermined period to allow the user to cause movement of the position of the indicator.

In another aspect, there is provided a non-transitory computer readable medium comprising computer program code stored thereon, the computer program code and computer readable medium being configured to, when run on at least one processor, perform at least the following:
presenting, in response to detection of first touch signalling on a particular portion of a touch-sensitive display, a magnified view of at least that particular portion of the touch-sensitive display and an indicator positioned corresponding to the detected position of the first touch signalling;
upon release of the first touch signalling, maintaining the magnified view of that particular portion and the positioned indicator for a predetermined period; and
allowing for detection of second touch signalling during the predetermined period to allow the user to cause movement of the position of the indicator.

References to a single "processor" or a single "memory" can be understood to encompass embodiments where multiple "processors" or multiple "memories" are used.

The present disclosure includes one or more corresponding aspects, embodiments or features in isolation or in various combinations whether or not specifically stated (including claimed) in that combination or in isolation. Corresponding means for performing one or more of the discussed functions are also within the present disclosure.

Corresponding computer programs for implementing one or more of the methods disclosed are also within the present disclosure and encompassed by one or more of the described embodiments.

The above summary is intended to be merely exemplary and non-limiting.

BRIEF DESCRIPTION OF THE FIGURES

A description is now given, by way of example only, with reference to the accompanying drawings, in which:—

FIGS. 6a-g shows the operation of an embodiment of the present disclosure.

DESCRIPTION OF EXAMPLE ASPECTS/EMBODIMENTS

Figures 1A, 1B:
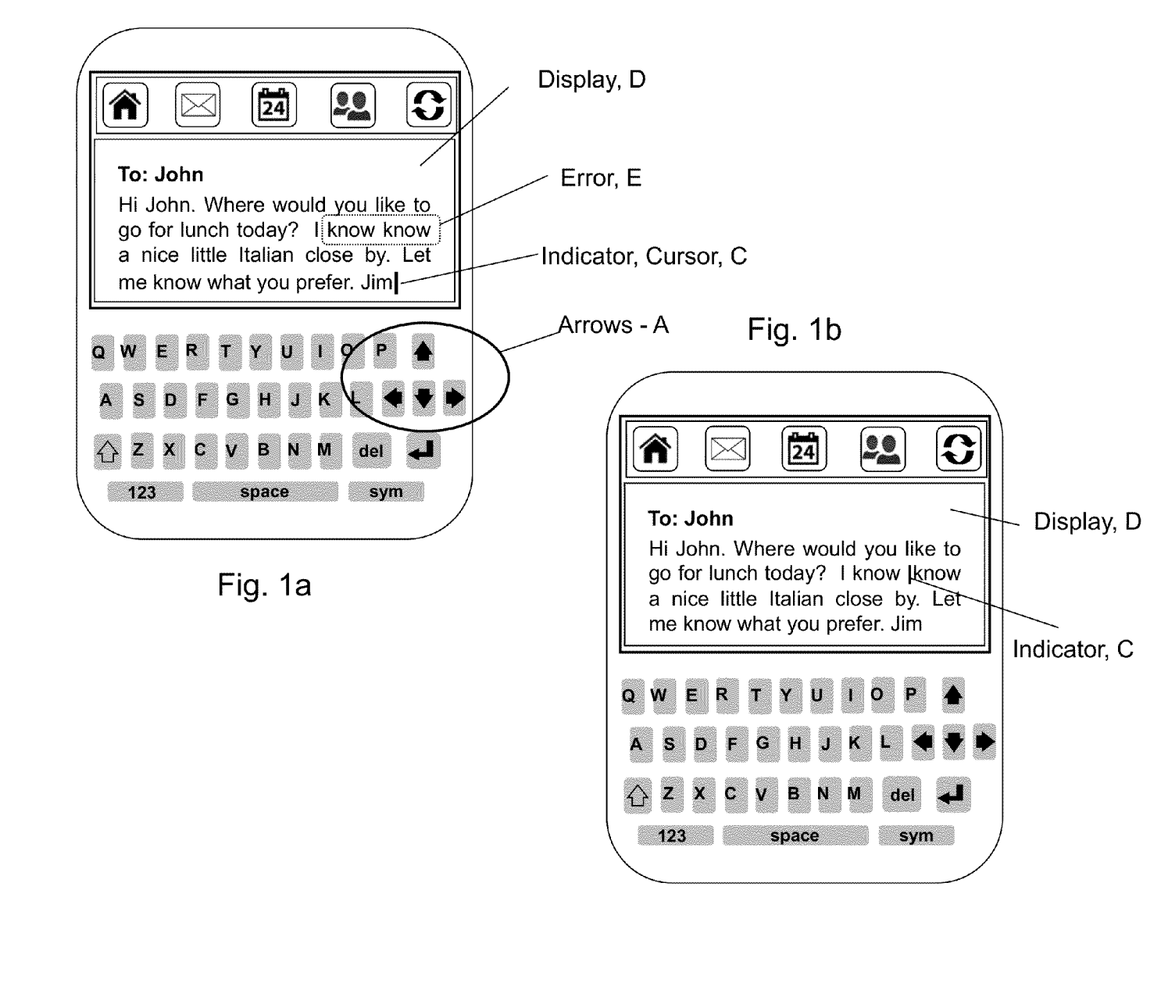
FIGS. 1a and 1b show an example device and its operation.

There are many different types of electronic devices available to the general public at present. Many of these are types of devices that allow for entry, presentation and editing of content such as text, images, video, or the like. FIGS. 1a and 1b illustrate one example of such an electronic device, like a mobile telephone, a touchpad, or PDA or the like.

This device has a standard device body together with a tactile user interface consisting of various buttons, and a display for displaying content. This device can perform a great many functions accessible via menus and shortcuts. Like many presently available mobile telephones, this device allows for composition and sending of texts or even emails to other users of electronic devices.

In the example of FIG. 1a, the device user 'Jim' is composing a text to his friend 'John'. The message Jim has composed relates to Jim and John going for lunch somewhere. However, Jim has made an error, E, in his text and accidentally written the word 'know' twice. Such errors can be common when writing texts or emails on such small devices due to the small button size and limited spacing between buttons/keys. Other errors such as insertions, omissions, deletions or substitutions are also commonplace errors. In this example, Jim has accidentally entered the same word twice, and therefore wishes to delete one of the instances of the word 'know'. To do so, he must navigate the indicator/cursor, C (or 'caret') back from the end of the recently completed text message to the word 'know' so that he can operate the cursor/caret to correct his mistake. As is appreciated by those skilled in the art, cursors/carets denote the mark from which further text editing occurs, e.g. new text entered is inserted at the point of that cursor/caret on the display, D, deletion instructions delete letters immediately adjacent to (e.g. before or after) the cursor, etc. The operation of electronic devices with such cursors/carets is well known in the art across many different types of device and so will not be discussed further here.

Now, in this example, the user interface has arrow keys, arrows-A (up, left, down, right—much like a full size QWERTY keyboard but scaled to fit onto a hand-held mobile device) that enable the user, Jim, to navigate through the onscreen text to the appropriate place in the message that he wishes to edit. This is illustrated in FIG. 1b. Jim has navigated the cursor from the end of the message to the second instance of the word 'know' and can then proceed to operate the 'delete' key to remove the excess word. This navigation through the text message is a relatively easy and painless experience for a user with a tactile interface like in the device of FIG. 1. However, with certain devices it can be harder for users to easily or accurately position their cursor to the appropriate point for editing or the like.

Figures 2A, 2B:
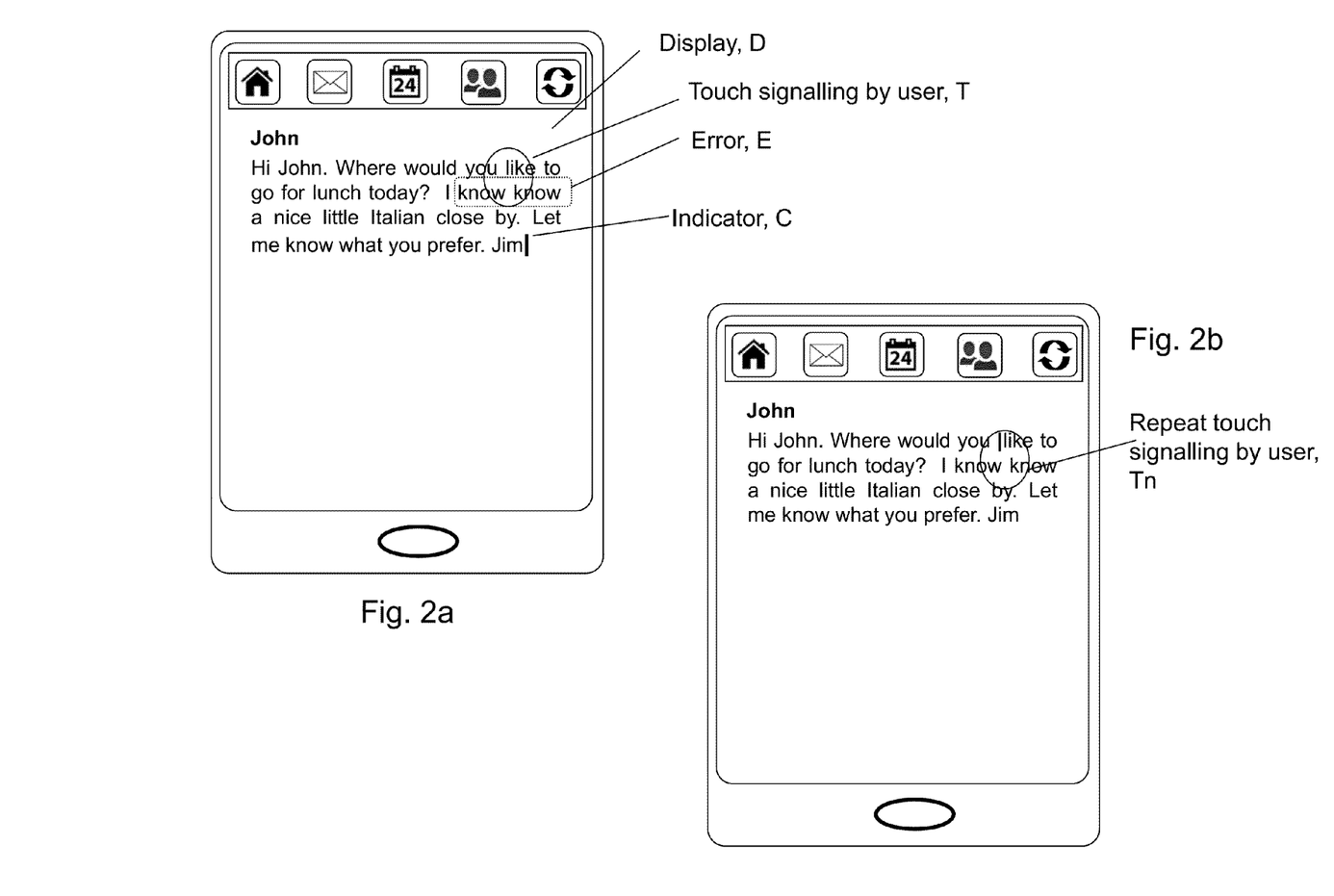
FIGS. 2a and 2b show another example device and its operation.

For example, FIGS. 2a and 2b show an example of a device much like that of FIGS. 1a and 1b, except that this is a touch-screen device. For example, these touch-sensitive displays/touch-screens can operate on different physical principles, such as the following types of touch-display technology: resistive, surface acoustic wave, capacitive (such as surface capacitive, projected capacitive, mutual capacitive, self-capacitive, or the like), infrared, optical imaging, dispersive signal, or acoustic pulse recognition. In such touch-screen devices, most of the user input is received via the touch-sensitive display.

For the sake of simplicity, we shall describe the operation of this device as if Jim was sending the abovedescribed method to his friend John using the touch-screen device of FIG. 2a. Jim has composed his message and made the error of repeating the word 'know' in the text message. He wishes to navigate the cursor to be immediately adjacent to one of the instances (say, the second instance of the word 'know' for example) so that he can correct the error.

In touch-screen devices, a user will often use their finger to use menus, press displayed button areas, and also to control the positioning of a cursor or indicator onscreen. Therefore, Jim is able to place his finger onto the display D of the device and generate touch signalling by user, T upon contact with the display. The device then translates this into positioning information for the cursor and moves the cursor accordingly. Once a cursor has been positioned on a device screen, it is possible to initiate various types of operations on content like copying, pasting, highlighting, selecting, deletion, insertion (or the like) of content.

However, a difficulty with this is that fingers are often quite inaccurate for the purposes of positioning cursors onscreen. The relative difference between the size of most fingers and the size of most cursors/text onscreen is quite large, and it can mean that although a user might think they have touched the screen in exactly the right place, the area of the fingertip is larger than that which is needed to provide an accurate positioning onscreen. The touch-screen technology resolution may also not be sufficiently refined to allow for accurate recognition of the true location of a user's finger.

So what would happen in FIG. 2a is that Jim would touch the screen but the inaccuracy inherent in using a finger on a touch-sensitive display or the technological limitations mean that the cursor jumps to a different line of text than he intended (see FIG. 2b), and so needs to provide repeat touches and generate repeat touch signalling by user, Tn to try and move the cursor/indicator to the right place in the text. Nevertheless, the same problem can occur time and time again due to the innate inaccuracy of fingers on touch screens or the technological limitations of such screens.

Figure 3A:
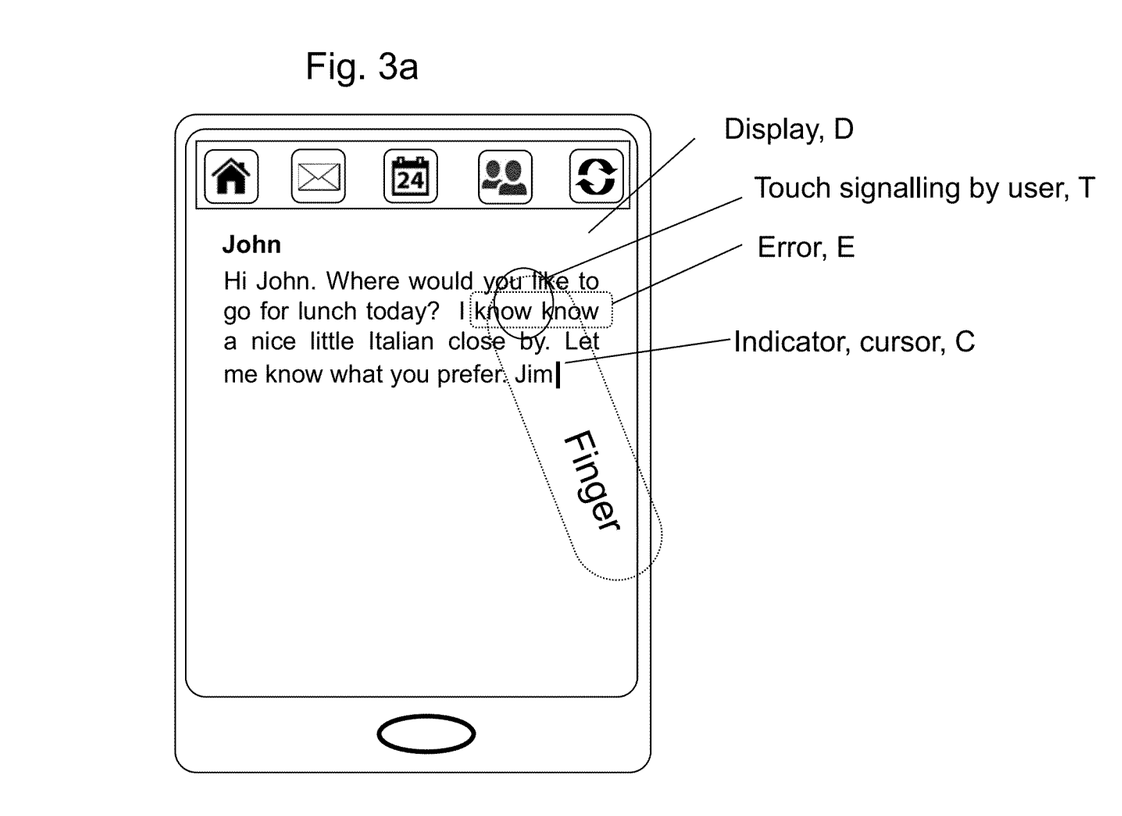
FIGS. 3a-3c show another example device and its operation.
Figure 3B:
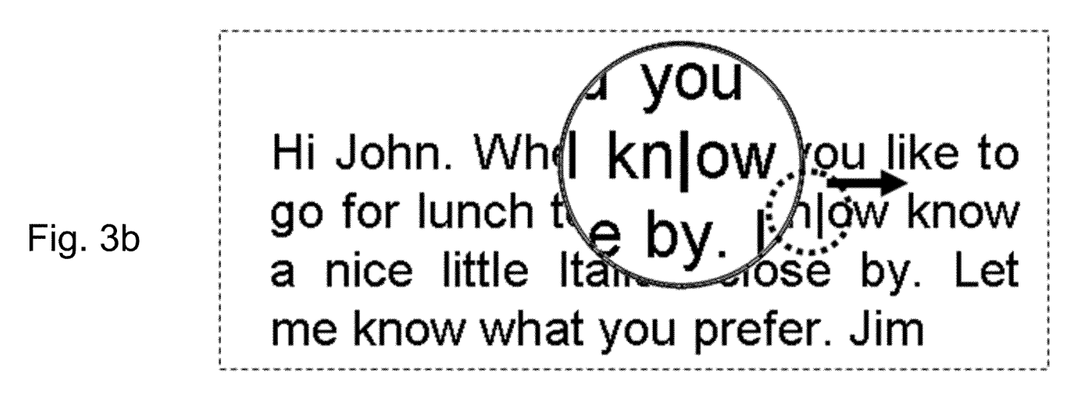
Figure 3C:
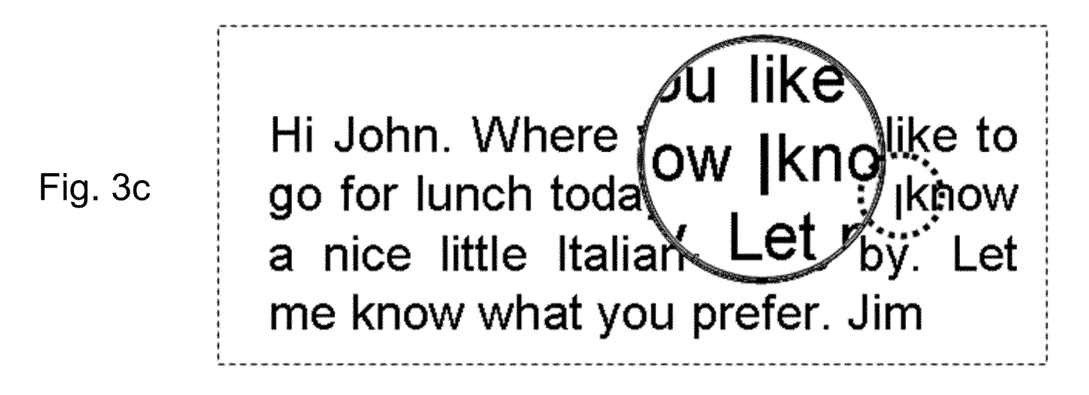

FIG. 3a shows an example of a device that tries to alleviate this issue. For the purposes of the explanation of the present disclosure, it is sufficient to say that the device of FIG. 3a in this regard is identical to the device of FIG. 2a, except that it provides the user with additional information to help navigate the cursor to the desired location. In essence, what this device of FIG. 3a does is depict a representation of a magnifying glass/viewer that is enlarging the area of the display that the user is touching together with the cursor in that region in a separate 'window' away from the user's finger. This is shown in FIGS. 3b and 3c. This means that a user can see exactly where the cursor is and control movement of the cursor accordingly.

"Touch signalling" can be understood to encompass any signalling that is generated by a touch-sensitive display or touch-screen device or the look that is representative of a user interaction with the touch-sensitive display or touch-screen device. For example, touch signalling can be generated by a display/screen in response to the user 'tapping' an icon with their finger, or sliding their finger across the screen in a straight line or non-straight line, or making repeated contact and lift-off with the screen using their finger, or even in response to a user hovering their finger over the screen without making direct contact with the screen.

Figure 4A:
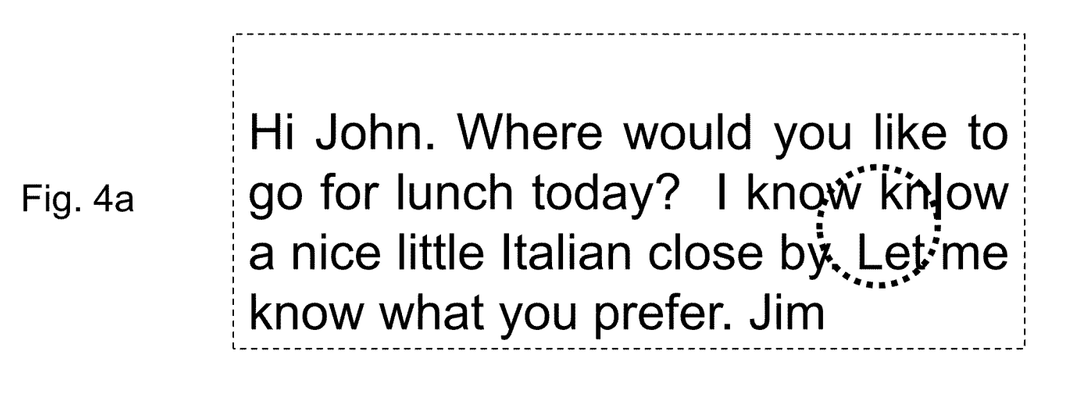
FIGS. 4a and 4b show how a user has to operate particular example devices.
Figure 4B:
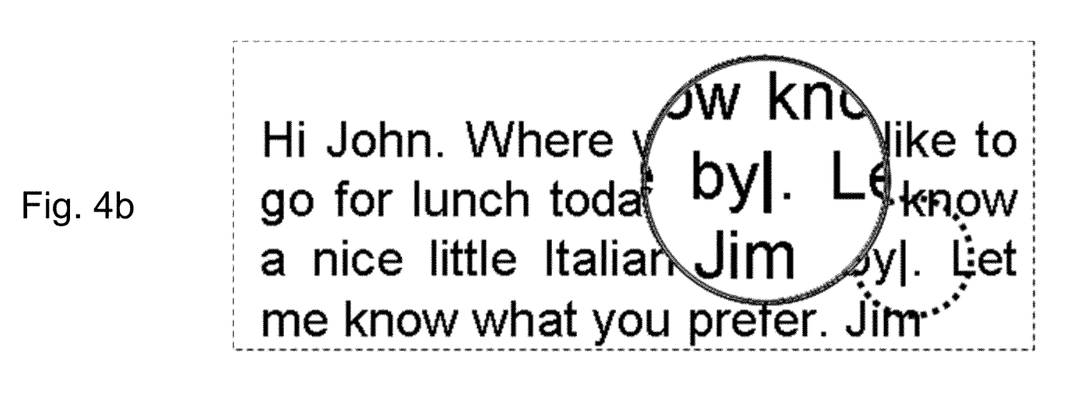

However, there can still be difficulties inherent with the examples of FIGS. 3a and 3b. When a user lifts their finger off of the screen it is very easy for the flesh of the finger or unintended movement to cause the display to generate aberrant touch signalling, i.e. the display generates touch signalling representative of the user instructing further movement of the cursor, even though the user did not actually desire or mean such touch signalling to be generated. This means that the cursor moves away from the intended point as the user removes their finger from the touch-screen. FIGS. 4a and 4b depict this difficulty, whereby the user has previously correctly positioned the cursor (as in FIG. 3b) but removal of the touch signalling sends the cursor to another position. In FIGS. 4a and 4b, as a user removes their finger they can accidentally generate touch signalling (FIG. 4a) on the touch-sensitive display that results in the indicator being moved away (FIG. 4b) from the position in which the user actually wanted the indicator to remain.

More than this, immediately or almost immediately after the user removes their finger and the touch-sensitive signalling ceases, the magnified representation that was provided as part of the positioning process is removed/no longer provided. In essence, the remnance of the magnifying glass/viewer is dependent wholly on whether the touch signalling is present or not. This means that if there is no touch signalling then there is no viewer, and the ceasing of such touch signalling means that a substantially immediate removal of the magnifying glass/viewer occurs.

This means that if the user realises that the indicator was inadvertently moved by way of their finger removal and the user then tries to correct this change in cursor position, when they re-engage their finger with the touch-sensitive display the inherent inaccuracy of using their finger or the technological limitations of the display can result in the indicator being moved again still further away from the intended position. This essentially means that the whole process must be repeated, and (depending on the user and device/technology in question) possibly more than once in order to achieve the desired cursor positioning.

In general, whilst these difficulties that the user can experience could occur when using a stylus or their fingers these difficulties can be exacerbated in situations where the user is using one or more of their fingers. This is because it can be inherently more inaccurate for a user to use their finger over a normal stylus, because the finger is comparable to using a large, soft, blunt stylus. This increases the probability of erroneous or unintended touches to be made by the user on the screen. One or more embodiments described herein can address some of these difficulties that users face in such scenarios of trying to accurately operate touch-sensitive displays.

In one or more embodiments described herein, there is provided an apparatus which comprises at least one processor and at least one memory including computer program code. The at least one memory and the computer program code are configured to, with the at least one processor, cause the apparatus to perform certain steps. Firstly, the apparatus is caused to present, in response to detection of first touch signalling on a particular portion of a touch-sensitive display, a magnified view of at least that particular portion of the touch-sensitive display and an indicator positioned corresponding to the detected position of the first touch signalling. Secondly, the apparatus is caused to, upon release of the first touch signalling, maintain the magnified view of that particular portion and the positioned indicator for a predetermined period. Thirdly, the apparatus is caused to allow for detection of second touch signalling during the predetermined period to allow the user to cause movement of the position of the indicator.

By maintaining the magnified view during the predetermined period, and also allowing for detection of second (i.e. further) touch signalling during this predetermined period, a user can essentially re-engage with the touch-sensitive display of the electronic device to recommence positioning of the indicator rather than having to start from scratch again. This can allow a user to get a more accurate picture (via the maintained magnified view) of the current position of the indicator within the content, and also provide for more precise positioning (via the maintained magnified view) of the indicator when recommencement occurs. These advantages can be derived by virtue of just keeping the magnified view onscreen for even a second or a few extra seconds after the user initially releases the first touch signalling, rather than removing the magnified view as soon as touch signalling is removed. Because the magnified view is maintained onscreen, it permits the user time to provide further touch signalling to allow for further movement of the indicator, whereas the example devices discussed above do not allow this because the magnified view disappears substantially immediately after the initial touch signalling ceases.

Figure 5A:
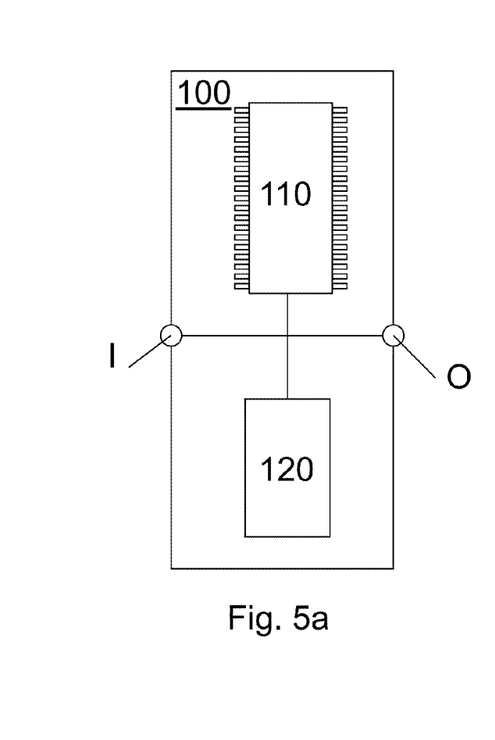
FIGS. 5a and 5b show an embodiment of the present disclosure.

We will now describe a first embodiment with reference to FIGS. 5*a-b* and 6*a-g*. FIG. 5*a* shows an apparatus 100 comprising a processor 110, memory 120, input I and output O. In this embodiment only one processor and one memory are shown but it will be appreciated that other embodiments may utilise more than one processor and/or more than one memory.

Figure 5B:
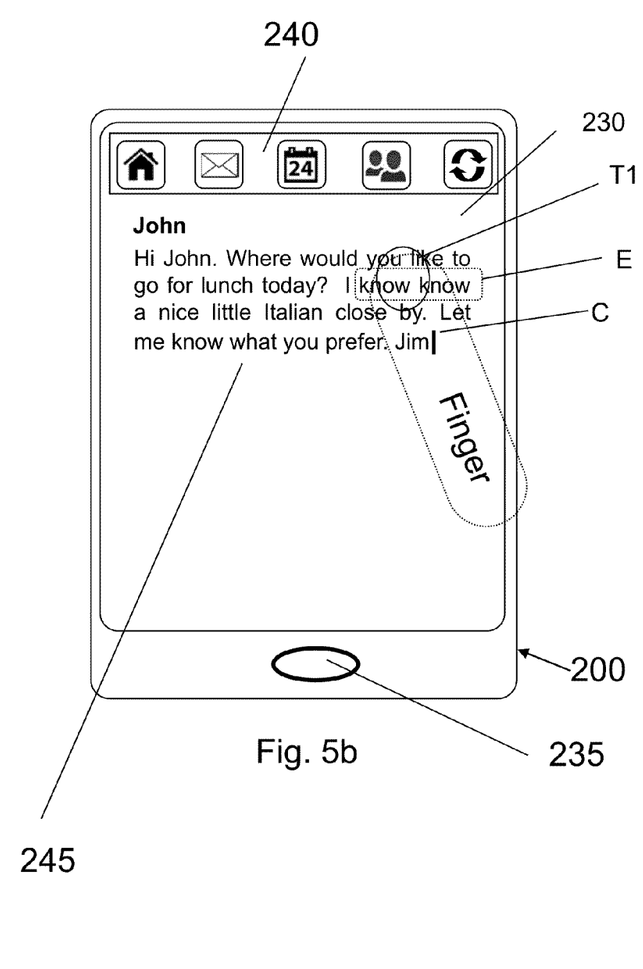

In this embodiment the apparatus 100 is an application specific integrated circuit (ASIC) for a portable electronic device 200 with a touch sensitive display 230 as per FIG. 5*b*. In other embodiments the apparatus 100 can be a module for such a device, or may be the device itself, wherein the processor 110 is a general purpose CPU of the device 200 and the memory 120 is general purpose memory comprised by the device 200.

The input I allows for receipt of signalling to the apparatus 100 from further components, such as components of a portable electronic device 200 (like the touch-sensitive display 230) or the like. The output O allows for onward provision of signalling from within the apparatus 100 to further components. In this embodiment the input I and output O are part of a connection bus that allows for connection of the apparatus 100 to further components.

The processor 110 is a general purpose processor dedicated to executing/processing information received via the input I in accordance with instructions stored in the form of computer program code on the memory 120. The output signalling generated by such operations from the processor 110 is provided onwards to further components via the output O.

The memory 120 is a computer readable medium (solid state memory in this example, but may be other types of memory such as a hard drive) that stores computer program code. This computer program code stores instructions that are executable by the processor 110, when the program code is run on the processor 110.

In this embodiment the input I, output O, processor 110 and memory 120 are all electrically connected to one another internally to allow for electrical communication between the respective components I, O, 110, 120. In this example the components are all located proximate to one another so as to be formed together as an ASIC, in other words, so as to be integrated together as a single chip/circuit that can be installed into an electronic device (such as device 200). In other embodiments one or more or all of the components may be located separately from one another (for example, throughout a portable electronic device like device 200). In other embodiments, the functionality offered by each of the components may be shared by other functions of a given device, or the functionality required by each of the components may be provided by components of a given device.

The operation of the present embodiment will now be described, and the functionality of the computer program code will be explained.

In this embodiment, the apparatus 100 is integrated as part of a portable electronic device 200 (see FIG. 6*b*). The device 200 has a touch-sensitive display 230 (also known as a touch-screen display) and also a physical 'home' button/key 235. These are the only two components of the device 200 that are able to receive input from the user on the front face of the device 200. In this or other embodiments, buttons/keys may be provided on other surfaces, e.g. to control volume, or physical shortcut keys.

The display 230 provides various portions of visual user output from the device 200 to the user. For example, in this example the display 230 provides shortcut keys 240 to various functions/applications that a user can press to access those other functions/applications whilst in another application or using another function. The device display 230 is also configured to provide content on the display associated with at least one running application. In this example, the running application is a text messaging application 245 substantially similar to that used in the examples of FIGS. 1-4. Other applications can provide content comprising text, images, or video/video regions, or combinations of those types and other types.

This device 200 operates in substantially the same way as the device discussed in the example of FIG. 4a-4b. When a user wishes to edit text by way of touching the touch-sensitive display (230) a magnified view of the portion the user has touched is presented to allow him/her to more easily navigate the text with the cursor or indicator that is also presented in that magnified view. A text cursor or indicator for browsing text is also known as a 'caret'. In the following examples, the magnified view is positioned away from the content that the user wishes to navigate with the cursor. This could mean that the magnified view is positioned so that it does not overly the area/region that the user is trying to navigate, or it may only partially overly that area/region.

For the sake of simplicity, we will describe the operation of this embodiment in a similar fashion to the examples described above, but as if Jim were sending his message to John using this device 200 instead. FIG. 5b shows that Jim has composed this message with an erroneous repeat instance of the word 'know' (circled by error, E).

FIGS. 6a-g show the operation of the present embodiment. Such embodiments can effectively be considered to show an indicator positioning 'mode' which enables indicator positioning within content to be navigated/edited by a user.

Figure 6A:
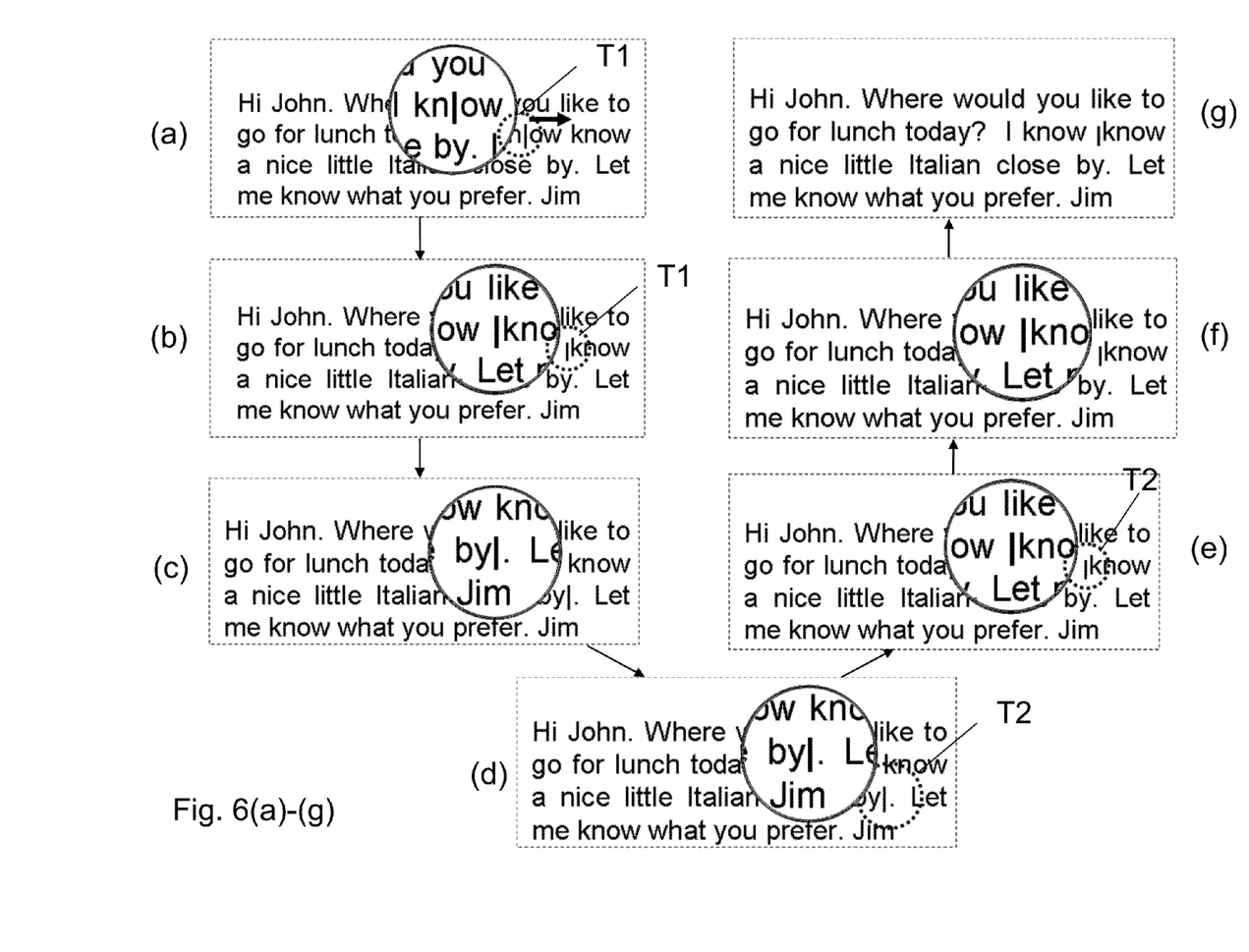

FIG. 6a begins to illustrate how this device works at the point after Jim has finished (or partially finished) composing his message and then wishes to reposition the indicator, C, by the second instance of the word 'know' to remove this error. The user touches the display 230 approximately adjacent to the second instance of the word 'know', thereby generating touch signalling (technically first touch signalling, T1, on the touch-sensitive display). However, because of the difficulty of using a touch-sensitive display accurately with fingers/touch technology the indicator C ends up a few characters to the left (within the first instance of the word 'know'). The user then slides his finger across the touch-sensitive display 230 to move the indicator C right towards the second instance of the word 'know'.

FIG. 6b shows how the user has now, through the continuation of first touch signalling T1 (e.g. continued touching of the display by sliding of the finger across the display 230), correctly positioned the indicator C by the second instance of the word 'know'. The user then removes their finger from the touch-sensitive display 230 thereby releasing the first touch signalling T1. However, as has been discussed above, it is possible with touch-sensitive displays that disengaging contact with a touch-sensitive display can sometimes result in inadvertent touch signalling being received by the display to reposition the indicator C further. For example, the user could accidentally drag their finger downwards slightly as they remove their finger from the display (230), and the display could interpret this as instructions from the first touch signalling T1 indicating that the indicator/cursor should be moved downwards on the displayed content. Other directions or movement types are also possible depending on how/when/which direction the user removes their finger.

FIG. 6c shows how the user has removed their finger and the cursor/indicator C has accidentally been repositioned to the line below (to after the word 'by') that which contains the second instance of the word 'know' (for example, because of the way in which the user removed their finger). In this embodiment, what happens is that the magnified view is not discontinued at the same time (or almost/substantially the same time) as the first touch signalling T1 ceases, but the magnified view is maintained on the display 230 for a predetermined period thereafter. In this embodiment, the predetermined period is a predetermined time periods of 2 seconds, though in other examples it can be a different time period (1 second, 3 second, or portions thereof, or more; or can be user-settable or default or the like). In other embodiments the predetermined period can be indefinite but is ended in response to a subsequent user input event (e.g. operation on text, home button, touch signalling elsewhere on the display, instruction for content modification, etc) that acts so as to end the predetermined period and exit the indicator positioning 'mode'.

In response to a display showing an image like that shown in FIG. 6c, a user can assess the magnified view and double check whether the indicator C is in the right position. In this case, the indicator C has been accidentally moved to a different line and so needs repositioning. Because the magnified view has been maintained, the user can easily re-enter the positioning operation by re-engaging with the touch-sensitive display to provide second touch signalling T2. For example, if the second touch signalling T2 occurs at a region nearby to the magnified view (the magnified view or another part of the display) this causes repositioning of the cursor to that positioning, and consequently updates the image shown in the magnified view to that new repositioned location of the cursor (FIG. 6e). Alternatively, the user could touch the currently indicated position of the indicator (FIG. 6d) and slide to the new intended position (FIG. 6e), or touch the current indicated position (FIG. 6d) and then separately touch (by first releasing contact with the display) the intended position (FIG. 6e) without continuous slide touching.

In one or more of these examples, the magnified view moves to maintain a predetermined distance away from the new location of the cursor (e.g. centimeters away, or a number of finger's widths away). In other examples, the magnified view does not actually move and instead remains static onscreen, but what is displayed within the magnified view is updated to reflect the new position of the cursor.

Alternatively, the user can effectively use their second touch signalling to interact with the maintained magnified view to effectively "grab" (e.g. interact with) the magnified view. When a user "grabs" the magnified view, this means that they are able to re-engage with the indicator positioning operation and control the position of the indicator via touch signalling. In certain embodiments, when the user 'grabs' the magnified view, the user interacts with the magnifier view to allow the user to cause movement of the indicator. In some embodiments the interaction comprises movement of the actual magnified view, in others the interaction comprises movement of the view provided within the magnified view, and in others the interaction comprises movement of the indicator within the magnified view. These variations are discussed in detail below. It should be pointed out the cursor and magnified view can be considered as two separate entities and therefore their position and movement need not be linked and they can be interacted with separately. The examples below will explain this more clearly.

In one "grabbable" example, the user can touch the magnified view and move the cursor around within the magnified view, while the magnified view itself does not move and stays static onscreen. In another example, the user can touch the magnified view, and the whole magnified view together with the cursor is movable around onscreen by sliding of the user's finger. This means that the magnified view effectively provides a large 'grab' area with the cursor fixed at the centre (or other fixed relative location) for example, in a similar fashion to a 'target' area for the user, so that the user is able to move the cursor around the screen accordingly by sliding of their finger. In such examples the relative movements of the cursor and magnified view are locked together.

In another example, the user can touch the magnified view and, by sliding finger movement, drag the magnified view elsewhere onscreen whilst the location of the cursor remains static (e.g. outside the magnified view if the magnified view is sufficiently moved). The image displayed within the magnified view is updated as the magnified view is moved around onscreen to reflect a zoomed in region of the display that is a relative spatial distance from the particular location of the magnified view. For example, the magnified view could be magnifying the region directly underneath itself, or a fixed distance away in a given direction from the magnified view. Once the magnified view is released by the user (by release of contact with the display) the user can then touch again within the magnified view (by way of such third touch signalling) to select a new cursor position within the magnified view.

All of the above examples can be settings that can be stored and performed by the same apparatus 100 upon selection/configuration by a user. Of course, other embodiments allow for areas proximate to the magnified to be interacted with in a similar way.

Returning to our discussion of FIG. 6, FIG. 6e shows how a user, having recommenced positioning of the cursor/indicator with second touch signalling T2, has repositioned (by sliding from the position in FIG. 6d to that shown in FIG. 6e) the indicator to the correct position (again) for deleting the second instance of the word 'know'.

The user then removes the second touch signalling, but can do so more carefully so as to reduce the likelihood of erroneous touch signalling being received upon removing their finger—this is shown in FIG. 6f. In other embodiments, a further touch just before disengagement could be ignored to avoid the detection of erroneous touch, e.g. if two touches are detected just before release (with half a second of release, for example), then the apparatus 100 could ignore the first/second touch (as appropriate). It is important to note that the magnified view is, again, still maintained onscreen so that the user can double check the indicator is in the right location onscreen for their desired editing operation. As the user has correctly positioned the indicator even after removing the second touch signalling T2, and this can be confirmed via the maintained magnified view, the user can then proceed with the desired editing operation of the text.

In another embodiment, the apparatus 100 allows for movement of the indicator during the predetermined period only within the already presented magnified view. In effect, this means that the magnified view can be considered to be locked to the region in which the first touch signalling was received such that the indicator can only be repositioned within the magnified view of that initial region. In other embodiments, the magnified view is not locked in such a way, and the apparatus is able to present, in response to detection of second touch signalling during the predetermined period on a particular portion of a touch-sensitive display of an electronic device, a magnified view of at least that particular portion of the touch-sensitive display (not necessarily the same as the first magnified view or corresponding display portion of the first touch signalling) and an indicator positioned corresponding to the detected position of the second touch signalling.

After the predetermined period ends the magnified view is no longer presented (see FIG. 6g) and the user can proceed with editing the text. It should be noted that in some examples the elapsing of the predetermined time period can be displayed onscreen (e.g. via a countdown, virtual hourglass, etc) so that a user knows how much time is left before the magnified view is discontinued. In other examples the period can be ended by a user input event of some description, such as touch signalling that relates to an instruction to perform editing or content modification (e.g. an onscreen delete key being pressed thereby indicating that the user has finished the cursor/indicator positioned and is satisfied with the position of the indicator for the purposes of editing the content).

In summary, by keeping the magnified view onscreen after the first touch signalling is removed (for a predetermined period thereafter) a user is able to recommence positioning the indicator, i.e. pick up where he left off, rather than having to start again from scratch. This is advantageous because it helps reduce a user's frustration with trying and failing to accurately position an indicator onscreen to select (e.g. including highlighting for cutting, copying or pasting) or edit particular content. It should also be pointed out that the various examples can be useable to control displays on other electronic devices or projectors or the like, and not just relating to the display of the device in which the apparatus 100 might be comprised. This can allow a user to position their indicator for various operations such as insertion, deletion or selection of content.

For example, the user might wish to highlight a portion of text for deletion/copying/format alteration, so they could perform a 'double-click' operation to initiate selection of the text (i.e. two touch taps performed in quick succession) whereby the second touch tap is held by the user to initiate the first touch signalling for the positioning 'mode' operation as described above. They can then drag the indicator/cursor to select text in a particular direction (or other content instead/as well) as part of the indicator positioning, and can reposition the indicator in the same fashion as one or more of the embodiments described above.

Allowing a user to remove their finger then re-engage to allow for further movement means that the user can remove their finger so as to see whatever region their finger might otherwise have been obscuring. This can be advantageous in devices with small displays or for users who like to use small font sizes, as maintaining a finger on the display for indicator positioning therefore 'robs' the device of valuable useable display area.

In the example of FIGS. 6a-g, the user has disengaged with the touch-sensitive display 230 and successfully left the indicator in the correct position after a second attempt. However, it is possible that the user could inadvertently reposition the cursor that second time, or even a third time, or an indefinite number of times depending on their accuracy, dexterity or the sensitivity of the display 230.

Therefore, a further embodiment (not shown) of the present disclosure provides that, upon receipt of second touch signalling, the movement of the cursor in response to such second touch signalling is at a lower granularity than the movement of the cursor that would be in response to the first touch signalling. In essence, this operates on the principle that if a user is having to, for a second (or further) time, reposition the indicator/cursor then the user is clearly struggling with the positioning action on that device. Therefore, in response to detecting that a user is repositioning an indicator/cursor that has already been positioned at least once, the granularity of movement is reduced so that it requires more absolute movement of the user's finger across the display to move the indicator across a given distance on the display 230.

For example, in response to first touch signalling if the user moves their finger 1 millimeter/centimeter across the display then the cursor is moved 1 millimeter/centimeter across the display, i.e. a 1:1 ratio. However, in response to second touch signalling this granularity of ratio of respective movement is changed. This means that if the user wants to move the cursor 1 millimeter/centimeter across the display then they need to move their finger 2 millimeters/centimeters across the display. This decrease in granularity can be performed only a set number of times in response to receiving a certain number of instances of further touch signalling (e.g. second, third, fourth, etc) so that the decreased granularity does not change again even in response to any instances beyond a certain number. However, there are of course other embodiments where the granularity can incrementally decrease per each further touch signalling event determined as being associated with repositioning of the cursor by the user.

This helps to provide a more intuitive arrangement that identifies and responds to a user's needs based on what they might be finding difficult, e.g. by incrementally making it harder to misplace the indicator and therefore easier for a user to move the indicator to where they want it to be.

Figure 7:
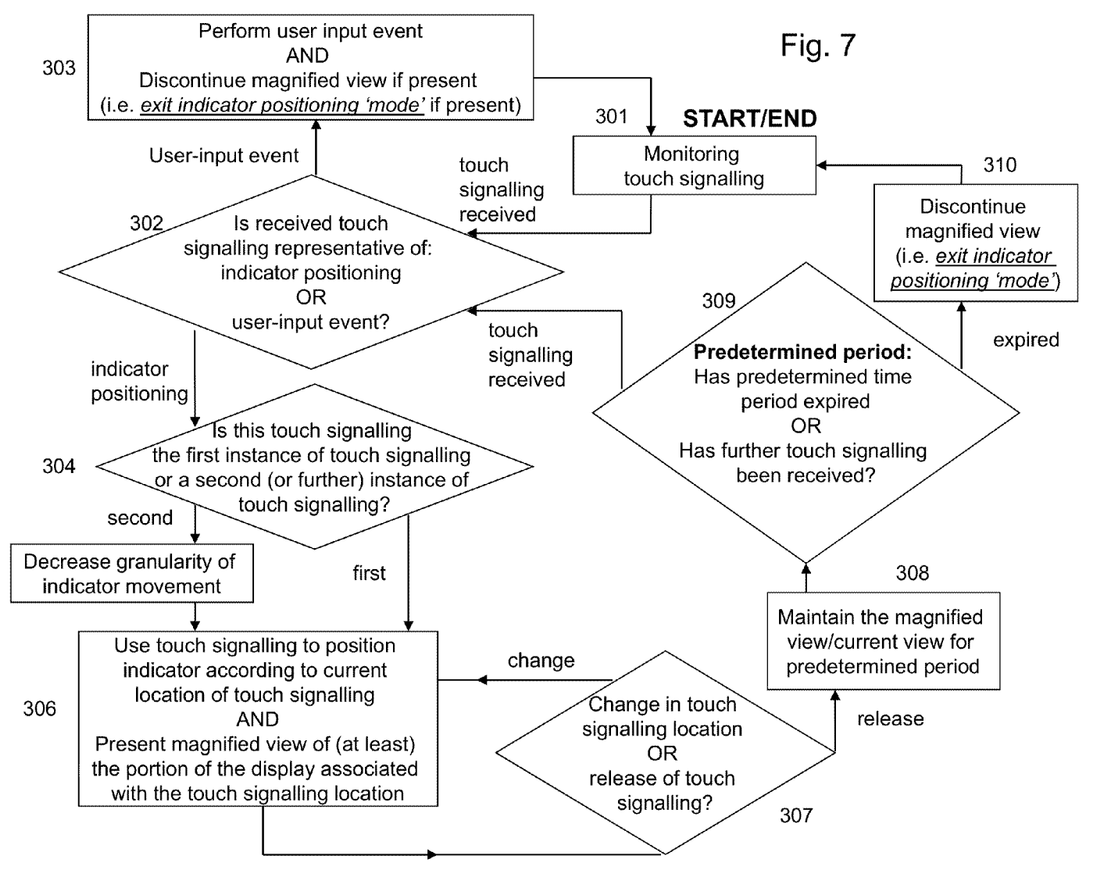
FIG. 7 shows a method of operation of an embodiment.

FIG. 7 shows a flow diagram of a specific embodiment of the present disclosure. In essence, this method is linked in to the general operation of the device 200 described above.

At the start, the device 200 is monitoring touch signalling (step 301) via the touch-sensitive display 230. Upon detecting that touch signalling is being received, it is necessary to distinguish whether the touch signalling from a user is representative of indicator positioning (e.g. moving the indicator onscreen relative to its current position) or a user-input event (e.g. instructing deletion, insertion of content, etc). It will be appreciated from the discussion above that, if a magnified view were being maintained onscreen, then such a user-input event could be utilised to cause discontinuation of that magnified view, i.e. the user-input event would act as an exit user-input event that exits the indicator positioning 'mode'. This will be discussed in more detail below.

The decision as to whether the touch signalling represents a user-input event or indicator positioning is performed at step 302. A user-input event comprising touch signalling can be considered to be representative of anything other than indicator positioning, for example, such as content modification like deletion/insertion/selection of content, or a shortcut key being pressed, etc. Providing a user-input event essentially 'exits' the indicator positioning operation.

If it turns out that the signalling relates to a user-input event, then step 303 is performed and the user-input event is performed, such as content being modified. After this step, the method cycles back to the monitoring step 301 and awaits further touch signalling to be received. The method can of course keep cycling round and round the user-input event loop (steps 301, 302, 303 repeatedly).

If it turns out that the signalling relates to indicator positioning, then the remainder of the steps are followed to accommodate such instructions from the user. Step 304 is then undertaken to ascertain whether the touch signalling is a first instance of touch signalling (within the context of a single indicator positioning process) or whether it is a second or further instance of touch signalling. Initially of course it will inherently be a first instance of touch signalling, but if a second/further instance of touch signalling occurs then this is detected at step 305 and, in response to that, the granularity of movement in relation to how much indicator movement occurs onscreen relative to how much movement the user's finger makes to elicit that movement will be modified to make it harder to move the indicator a given distance. This has already been explained above already, but we will return to this feature later as part of the continuing method.

In response to receiving this touch signalling representative of indicator positioning, step 306 uses the touch signalling to position the indicator according to the current location of the touch signalling. At the same time, step 306 also presents a magnified view of the portion (or at least that portion) of the display associated with the touch signalling location.

Decision 307 then monitors for changes in the touch signalling, specifically whether the touch signalling location has changed, or whether the touch signalling and ceased/been released. If the location changes then the feedback loop cycles back to step 306, so that the indicator is repositioned accordingly (e.g. refreshing the existing magnified view or providing a new magnified view) and this is also presented in the magnified view.

If the touch signalling is released, then step 308 maintains the magnified view. As has been discussed above, this is maintained for a predetermined period. Whether the predetermined period has ended, or is to be ended is assessed by step 309. This looks at whether the predetermined period (say, of 2 seconds) has expired, or whether further touch signalling has been received. If the period has expired, then the magnified view is discontinued at step 310 and the device 200 returns to its standard state of monitoring/awaiting touch signalling (step 301).

If the period has not expired, but new touch signalling is received, it is necessary to establish whether this further touch signalling is representative of indicator positioning or of a user-input event, i.e. whether the touch signalling comprises an exit user-input event that is to cause the apparatus 100 to exit the indicator positioning mode. This therefore returns the method to step 302. If in the case it is identified as a user-input event/exit user-input event, then step 303 is performed. In this case, where the magnified view has been maintained previously, the user-input event is performed, but step 303 additionally makes sure that any present magnified view is discontinued/no longer presented as part of this step 303. In short, step 303 will discontinue the magnified view if such a magnified view were still present (though in other embodiments this may not be the case).

If the further touch signalling is identified as being representative of indicator positioning, then the magnified view is not discontinued but maintained. This is shown by virtue of there being no explicit step to discontinue the magnified view by following that route round the flow diagram again. This time round the method, step 305 identifies that the touch signalling is actually the second instance of touch signalling and so decreases the granularity of the positioning so as to make it harder for the user to accidentally move the indicator. As mentioned above, certain embodiments may not include step 305 and can treat first and second/further touch signalling in the same way without decreasing granularity of movement.

This particular loop round the flow diagram (specifically—301, 302, 304, 305, 306, 307, 308, 309) can be repeated indefinitely depending on how the user chooses to interact with the device, and so the magnified view can be maintained on the device display 230 until the predetermined period ends without receiving further touch signalling representative of further indicator positioning, or until the device receives touch signalling representative of a user-input event.

It will be appreciated that the method can be used for highlighting content (e.g. start/end points of content by movement of the position of the indicator for copying/cutting/pasting functions). It will be appreciated that a hyperlink, file, or other such insertion can be more easily positioned to an accurate location by way of these disclosed embodiments.

Figures 8, 9:
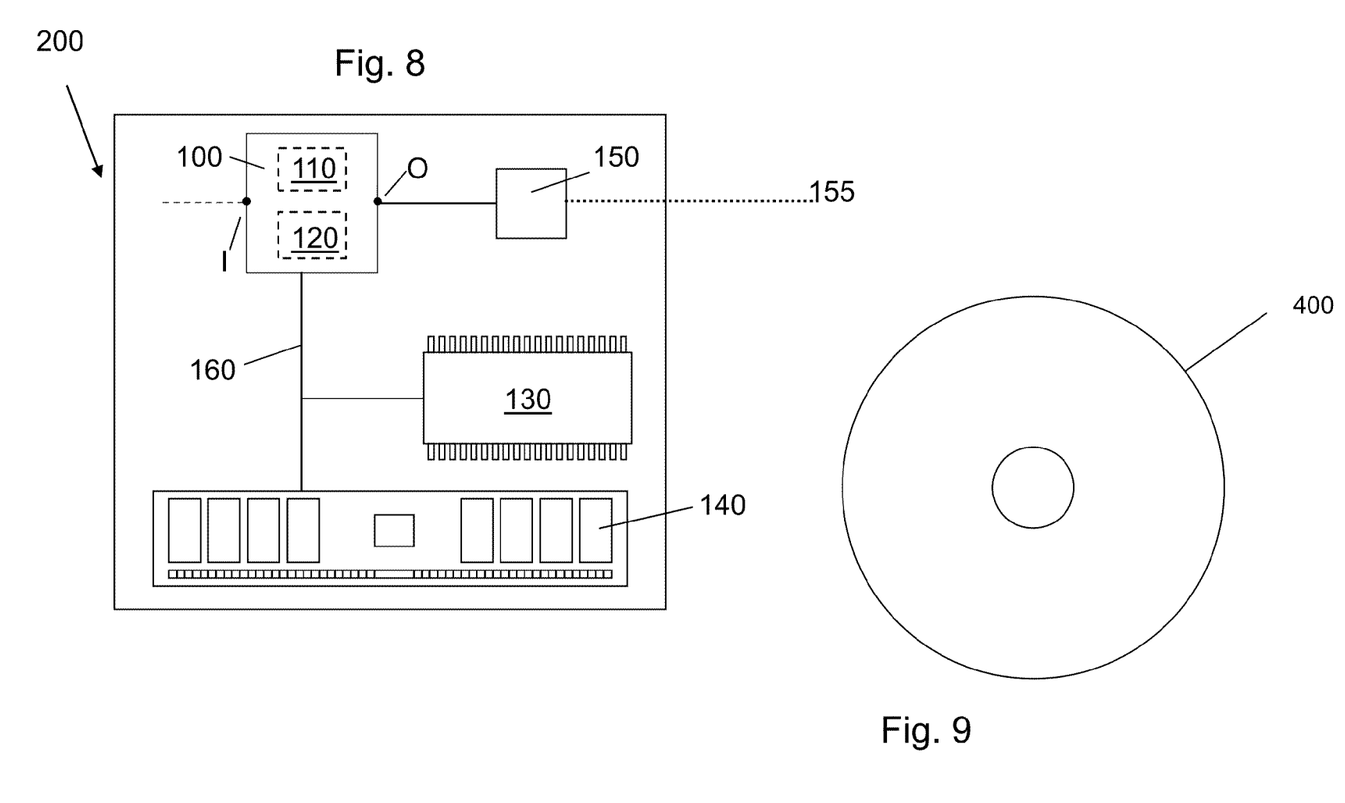
FIG. 8 shows another embodiment.
FIG. 9 illustrates schematically a computer readable media providing a program according to an embodiment of the present invention.

FIG. 8 illustrates how the apparatus 100 of FIG. 1a can be implemented in an electronic device 200. FIG. 8 illustrates schematically a device 200 comprising the apparatus 100 as per any of the embodiments described above. The input I is connected to a touch-sensitive display that provides information to the apparatus 100 regarding touch signalling received by the touch-sensitive display. The output O is connected to a display controller 150 to allow the apparatus 100 to control the position of the cursor or indicator as well as the magnified view presented on the display 230. The display controller 150 is also able to be connected to a different display 155 of another electronic device that is different to device 200.

The device 200 may be an electronic device (including a tablet personal computer), a portable electronic device, a portable telecommunications device, or a module for any of the aforementioned devices. The apparatus 100 can be provided as a module for such a device 200, or even as a processor for the device 200 or a processor for a module for such a device 200. The device 200 also comprises a processor 130 and a storage medium 140, which may be electrically connected to one another by a data bus 160.

The processor 130 is configured for general operation of the apparatus 100 by providing signalling to, and receiving signalling from, the other device components to manage their operation.

The storage medium 140 is configured to store computer code configured to perform, control or enable the making and/or operation of the apparatus 100. The storage medium 140 may also be configured to store settings for the other device components. The processor 130 may access the storage medium 140 to retrieve the component settings in order to manage the operation of the other device components. The storage medium 140 may be a temporary storage medium such as a volatile random access memory. On the other hand, the storage medium 140 may be a permanent storage medium such as a hard disk drive, a flash memory, or a non-volatile random access memory.

FIG. 9 illustrates schematically a computer/processor readable media 400 providing a program according to an embodiment of the present invention. In this example, the computer/processor readable media is a disc such as a digital versatile disc (DVD) or a compact disc (CD). In other embodiments, the computer readable media may be any media that has been programmed in such a way as to carry out an inventive function.

The present disclosure and embodiments described herein relate to the field of indicator or cursor positioning in electronic devices, associated methods, computer programs and apparatus, including those associated with touch or touch-sensitive user interfaces. One or more aspects/embodiments relate to portable electronic devices, such as hand-portable electronic devices (which may be hand-held in use, can be placed in a cradle in use, and the like) such as Personal Digital Assistants (PDAs), mobile radio-telephones, tablet computers, and the like.

Such portable electronic devices can also provide one or more functions such as: audio/text/video communication functions (e.g. tele-communication, video-communication, and/or text transmission (Short Message Service (SMS)/Multimedia Message Service (MMS)/emailing) functions), interactive/non-interactive viewing functions (e.g. web-browsing, navigation, TV/program viewing functions), music recording/playing functions (e.g. MP3 or other format and/or (FM/AM) radio broadcast recording/playing), downloading/sending of data functions, image capture function (e.g. using a (e.g. in-built) digital camera), and gaming functions.

It will be appreciated to the skilled reader that any mentioned apparatus/device and/or other features of mentioned apparatus/devices may be provided by apparatus arranged such that they become configured to carry out the desired operations only when enabled, e.g. switched on, or the like. In such cases, they may not necessarily have the appropriate software loaded into the active memory in the non-enabled (e.g. switched off state) and only load the appropriate software in the enabled (e.g. on state). The apparatus may comprise hardware circuitry and/or firmware. The apparatus may comprise software loaded onto memory. Such software/computer programs may be recorded on the same memory/processor/functional units and/or on one or more memories/processors/functional units.

In some embodiments, mentioned apparatus/devices may be pre-programmed with the appropriate software to carry out desired operations, and wherein the appropriate software can be enabled for use by a user downloading a "key", for example, to unlock/enable the software and its associated functionality. Advantages associated with such embodiments can include a reduced requirement to download data when further functionality is required for a device, and this can be useful in examples where a device is perceived to have sufficient capacity to store such pre-programmed software for functionality that may not be enabled by a user.

It will be appreciated that the any mentioned apparatus/circuitry/elements/processor may have other functions in addition to the mentioned functions, and that these functions may be performed by the same apparatus/circuitry/elements/processor. One or more disclosed aspects may encompass the electronic distribution of associated computer programs and computer programs (which may be source/transport encoded) recorded on an appropriate carrier (e.g. memory, signal).

It will be appreciated that any "computer" described herein can comprise a collection of one or more individual processors/processing elements that may or may not be located on the same circuit board, or the same region/position of a circuit board or even the same device. In some embodiments one or more of any mentioned processors may be distributed over a plurality of devices. The same or different processor/processing elements may perform one or more functions described herein.

It will be appreciated that the term "signalling" may refer to one or more signals transmitted as a series of transmitted and/or received signals. The series of signals may comprise one, two, three, four or even more individual signal components or distinct signals to make up said signalling. Some or all of these individual signals may be transmitted/received simultaneously, in sequence, and/or such that they temporally overlap one another.

With reference to any discussion of any mentioned computer and/or processor and memory (e.g. including ROM, CD-ROM etc), these may comprise a computer processor, Application Specific Integrated Circuit (ASIC), field-programmable gate array (FPGA), and/or other hardware components that have been programmed in such a way to carry out the inventive function.

The applicant hereby discloses in isolation each individual feature described herein and any combination of two or more such features, to the extent that such features or combinations are capable of being carried out based on the present specification as a whole, in the light of the common general knowledge of a person skilled in the art, irrespective of whether such features or combinations of features solve any problems disclosed herein, and without limitation to the scope of the claims. The applicant indicates that the disclosed aspects/embodiments may consist of any such individual feature or combination of features. In view of the foregoing description it will be evident to a person skilled in the art that various modifications may be made within the scope of the disclosure.

While there have been shown and described and pointed out fundamental novel features of the invention as applied to preferred embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. Furthermore, in the claims means-plus-function clauses are intended to cover the structures described herein as performing the recited function and not only structural equivalents, but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

The invention claimed is:

1. An apparatus comprising:
   at least one processor; and
   at least one memory including computer program code, the at least one memory and the computer program code configured to, with the at least one processor, cause the apparatus to perform at least the following:
   present, in response to detection of first touch signalling on a particular portion of a touch-sensitive display, a magnified view of at least that particular portion of the touch-sensitive display and an indicator positioned corresponding to the detected position of the first touch signalling;
   upon release of the first touch signalling, maintain the magnified view of that particular portion and the positioned indicator for a predetermined period; and
   allow for detection of second touch signalling during the predetermined period to allow the user to re-engage with the magnified view and recommence positioning of the indicator, wherein the indicator is repositioned as the user moves the second touch signalling relative to the touch sensitive display.

2. The apparatus of claim 1, wherein the at least one memory and the computer program code are configured to, with the at least one processor, cause the apparatus to allow for detection of the second touch signalling during the predetermined period to allow the user to cause movement of the position of the indicator at a lower granularity than the first touch signalling.

3. The apparatus of claim 1, wherein the at least one memory and the computer program code are configured to, with the at least one processor, cause the apparatus to present the magnified view such that it is positioned away from the associated particular portion of the touch-sensitive display.

4. The apparatus of claim 1, wherein the indicator is one or more of:
   a cursor, a caret, and an indicator of a highlighted region of displayed content.

5. The apparatus of claim 1, wherein the indicator is positionable to allow for highlighting of a particular area of at least some of the magnified view.

6. The apparatus of claim 1, wherein the magnified view is able to be grabbed by the user in response to second touch signalling so as to allow the user to cause movement of the position of the indicator.

7. The apparatus claim 6, wherein the magnified view is able to be grabbed so that the magnified view itself is movable, and the magnified view presents a magnified view of at least the particular portion of the touch sensitive display associated with the second touch signalling.

8. The apparatus of claim 6, wherein the magnified view is able to be grabbed so that the magnified view itself is movable, and the magnified view presents a magnified view of at least the particular portion of the touch sensitive display associated with the second touch signalling together with the indicator positioned corresponding to the currently detected position of the second touch signalling.

9. The apparatus of claim 6, wherein the relative position of the indicator in the magnified view is locked with the magnified view to allow for selection of a new indicator position with movement of the magnified view.

10. The apparatus of claim 6, wherein the view within the magnified view is refreshed to reflect the changing content as the magnified view is moved.

11. The apparatus of claim 1, wherein the indicator allows for one or more of:
    insertion, deletion, and selection of content proximate to the position associated with the indicator.

12. The apparatus of claim 1, wherein the predetermined period is one or more of:
    a predetermined time period, or until receipt of a user-input event.

13. The apparatus of claim 1, wherein the predetermined period is settable by the user, or set by default.

14. The apparatus of claim 13, wherein a user-input event comprises an exit input event to exit indicator positioning mode.

15. The apparatus of claim 1, wherein the at least one memory and the computer program code are configured to, with the at least one processor, cause the apparatus to:
    present, in response to detection of second touch signalling during the predetermined period on a particular portion of a touch-sensitive display, a magnified view of at least that particular portion of the touch-sensitive display and an indicator positioned corresponding to the detected position of the second touch signalling.

16. The apparatus of claim 1, wherein the at least one memory and the computer program code are configured to, with the at least one processor, cause the apparatus to:
    allow the user to cause movement of the indicator during the predetermined period only within the already presented magnified view.

17. The apparatus of claim 1, wherein the apparatus is one or more of:
    an electronic device, a portable electronic device, or a module for an electronic device/portable electronic device.

18. A method, comprising:
    presenting, in response to detection of first touch signalling on a particular portion of a touch-sensitive display, a magnified view of at least that particular portion of the touch-sensitive display and an indicator positioned corresponding to the detected position of the first touch signalling;
    upon release of the first touch signalling, maintaining the magnified view of that particular portion and the positioned indicator for a predetermined period; and
    allowing for detection of second touch signalling during the predetermined period to allow the user to re-engage with the magnified view and recommence positioning of the indicator, wherein the indicator is repositioned as the user moves the second touch signalling relative to the touch sensitive display.

19. A non-transitory computer readable medium comprising computer program code stored thereon, the computer program code and computer readable medium being configured to, when run on at least one processor, perform at least the following:
- presenting, in response to detection of first touch signalling on a particular portion of a touch-sensitive display, a magnified view of at least that particular portion of the touch-sensitive display and an indicator positioned corresponding to the detected position of the first touch signalling;
- upon release of the first touch signalling, maintaining the magnified view of that particular portion and the positioned indicator for a predetermined period; and
- allowing for detection of second touch signalling during the predetermined period to allow the user to re-engage with the magnified view and recommence positioning of the indicator, wherein the indicator is repositioned as the user moves the second touch signalling relative to the touch sensitive display.

* * * * *